(12) United States Patent
Raiyat

(10) Patent No.: US 6,493,037 B1
(45) Date of Patent: Dec. 10, 2002

(54) TELEVISION RECEIVER

(75) Inventor: Farzad Raiyat, Eastleigh (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/454,352

(22) Filed: Dec. 3, 1999

(30) Foreign Application Priority Data

Dec. 5, 1998 (GB) .............................. 9826695

(51) Int. Cl.⁷ ............................ H04N 7/00; H04N 7/08; H04N 5/445; H04N 5/50
(52) U.S. Cl. ...................... 348/564; 348/465; 348/468; 348/478; 348/906; 348/569
(58) Field of Search ................................ 348/564, 468, 348/461, 465, 467, 478, 906, 563, 569, 473, 589; 725/137, 136, 139, 40

(56) References Cited

U.S. PATENT DOCUMENTS

| | | | | |
|---|---|---|---|---|
| 4,337,485 A | | 6/1982 | Chambers | 358/147 |
| 4,991,018 A | * | 2/1991 | Davies | 358/147 |
| 5,208,671 A | * | 5/1993 | Tarrant | 358/147 |
| 5,374,961 A | * | 12/1994 | Jung | 348/468 |
| 5,386,238 A | * | 1/1995 | Kinghorn et al. | 348/468 |
| 5,635,987 A | * | 6/1997 | Park et al. | 348/468 |
| 5,650,826 A | * | 7/1997 | Eitz | 348/468 |
| 5,757,414 A | * | 5/1998 | Thorne | 348/1 |
| 6,064,439 A | * | 5/2000 | Kimura et al. | 348/468 |
| 6,239,844 B1 | * | 5/2001 | Raiyat | 348/468 |

FOREIGN PATENT DOCUMENTS

| | | | | |
|---|---|---|---|---|
| EP | 0037077 A2 | 10/1981 | | H04N/7/04 |
| EP | 0264565 A2 | 4/1988 | | H04N/7/087 |
| GB | 2146878 A | 4/1985 | | H04N/7/087 |

* cited by examiner

*Primary Examiner*—John Miller
*Assistant Examiner*—Paulos Natnael
(74) *Attorney, Agent, or Firm*—Edward W. Goodman

(57) ABSTRACT

A television receiver for receiving data such as teletext associated with the television picture. There are many ways in which pages of this data may be linked, and it is known to arrange, for easy access to the linked pages, by providing differently colored identification symbols (R1, Y1, G1, B1) on a display screen and correspondingly colored buttons on a remote control unit (RCU). A further identification symbol (FIS) which indicates the method by which further pages are linked to the currently displayed page is now provided. Examples of such linking are FASTEXT, TOP, Favorite Pages.

4 Claims, 3 Drawing Sheets

TELEVISION RECEIVER

BACKGROUND OF THE INVENTION

1. Field of the Invention

The invention relates to a television receiver for receiving a television picture signal having a data signal associated therewith a data signal, said data signal representing pages of text and/or graphics.

2. Description of the Related Art

The transmission of a data signal multiplexed with a television signal is well known. An example is the teletext standard in which data, representing pages of information to be displayed, is sent in the vertical blanking interval of a standard analog television picture signal. In addition, with the introduction of MPEG-encoded digital television transmissions, there is a provision for data signals representing pages of text and/or graphics to be multiplexed in the digital data streams representing the television picture signal. The data represents pages of information, and, in this context, a page refers to a quantity of data which is displayed at one time on a television display. Thus, normally one page will be displayed at a time, although it is possible to have a split screen and display a number of pages simultaneously.

With standard teletext transmissions, it is known for pages to be grouped in different manners, and for the data acquisition circuit to be instructed to acquire other pages within the group. One example is the FASTEXT system in which the page numbers of pages linked with the requested page are sent in extension packets, and the acquisition circuit is arranged to capture these pages which are defined by the data in the extension packets. The display of the captured page includes an additional row at the bottom of the page in which identification symbols for the linked pages are displayed. Typically, these identification symbols are short catch-words which identify the information content of the linked pages, and they are each displayed in a different color. Correspondingly, colored buttons are provided on a remote control unit, and a given linked page can be displayed by pressing the appropriately colored button. Such an arrangement has been disclosed in UK Patent Specification GB-A-2146878.

Another teletext signal which has a similar sort of grouping is the TOP System. In this system, a special page, known as Table of Pages, is transmitted which gives linkages between the different pages. Again, these linked pages can be accessed using colored buttons on a remote control unit which correspond to appropriately colored identification symbols in a row of the display.

Linking between pages can be specified in other ways. One facility is often referred to as habit watch. In this case, a microprocessor in a television receiver monitors the pages which are habitually accessed by a user or, alternatively, which were the last pages viewed before the television receiver was switched off, and instructs the data acquisition circuit to pre-capture these pages when the television set is next switched on. Again, these pages may be accessed by means of pressing selected buttons on a remote control unit which correspond to identification symbols on the display.

A television receiver may be arranged to acquire and store several different groups of pages, and the criteria for linking the pages of the group may be different according to the nature of the group. In the case of FASTEXT and TOP, the pages which are linked to form a group and the way in which they are linked is determined by the transmitting authority. With Habit Watch, also known as Favorite Pages, the pages which are grouped together are either obtained by the microprocessor monitoring those pages which are habitually selected by the viewer, or, alternatively, directly entered by a viewer by means of a set-up procedure using the keypad on the remote control unit to select a list of pages. A receiver may be able to acquire and store grouped pages according to any of these criteria. Clearly, if the identification symbols for each of the groups have the same format, this will minimize the number of coded buttons which need to be provided on a remote control unit. It does, however, have the disadvantage that it may be difficult for the viewer to determine which particular group of pages is being accessed at a particular time.

SUMMARY OF THE INVENTION

It is an object of the invention to enable an easier interaction between a user and a television receiver, where the television receiver is arranged to decode an associated data signal and store grouped pages of information which that data signal represents.

The invention provides a television receiver for receiving a television picture signal having a data signal associated therewith, said data signal representing pages of text and/or graphics, a page being the data displayable in place of or superimposed on a television picture, said television receiver comprising a data acquisition circuit for acquiring at least selected pages of said associated data, a multi-page memory for storing a plurality of pages of data, means for grouping acquired pages according to a plurality of different criteria, one or more of the pages of each group being linked with a page of that group currently being displayed, means for displaying a plurality of identification symbols relating to at least some of the pages linked to the displayed page, each of said identification symbols being related to a symbol on page selection means which is operable to select, for display, a linked page identified by an identification symbol, and means for displaying one or more further identification symbols which indicate which criteria apply to the group whose identification symbols are currently being displayed.

When a television receiver is capable of receiving and decoding data signals in accordance with the teletext standard, including both the TOP and FASTEXT grouped signals, and also electronic program guide (EPG) signals, it may be difficult for a viewer to keep track of which particular linking between pages in a group is effective at any given time. In addition, if a similar means is used for selecting pages of the Habit Watch group, it becomes increasingly difficult for the viewer to identify which group is presently being selected. In particular, it would be helpful for Habit Watch pages to be selected in the same way as TOP or FASTEXT linked pages, since this minimizes the number of buttons required on a remote control unit. This, however, adds to the potential uncertainty in knowing which particular group of pages is being selected and which linked pages are likely to be available. The invention allows for the display of further identification symbols which indicate which group the page belongs to, and, consequently, the viewer will be aware of the criteria which govern those pages linked to the displayed page. Thus, the user will be aware of whether the linking is by means of decisions made by the broadcaster, or whether the linking is to further favorite pages of the viewer.

The identification signals may be displayed in a row at a predetermined location outside the page on the display. The predetermined location may be the bottom row of the display screen.

This is the format in which the TOP and FASTEXT identification symbols are presently displayed, and retaining this format will enable the viewer to quickly learn how to interact with the information displayed, as previous knowledge of use of the arrangement with TOP and/or FASTEXT will be relevant.

Each of the identification symbols may have a different color. The page selection means may comprise a remote control unit having a plurality of colored keys having colors corresponding to those of the identification symbols, and means for selecting for display the page identified by the color of the key operated on the remote control.

This enables the same interaction between the television receiver and the viewer as is presently performed for the TOP and FASTEXT functions. Thus, the viewer does not have to learn a new protocol for interacting with the television receiver.

If a displayed page is a member of more than one group, then a corresponding number of rows of identification symbols may be displayed, a corresponding further symbol being associated with each row. As an example, a page may be a member of a group of favorite pages of a viewer and also have associated therewith FASTEXT or TOP links. Thus, a viewer may be able to select, by means of a first button which identifies the further identification symbol and a given colored button, the identification symbol of the page which the viewer wishes to have displayed. Clearly, a different page may be selected using the same colored key if the further identification symbol selected is different. As an alternative, a single row of identification symbols may be displayed, the information in the identification symbols being dependent on which of the further identification symbols is displayed alongside that row. Under these circumstances, it is necessary to be able to scroll through the further identification symbols in order to select linkages within the group that the viewer wishes to access. Thus, the viewer may access TOP, FASTEXT, Favorite Page groups, etc., by scrolling the further identification symbol and then using the colored button to select the linked page.

One of the groups may be a group of Favorite Pages which may be entered by a viewer or may be generated by monitoring the pages habitually selected by the viewer. The number of pages in the group need not be restricted to the number of identification symbols which may be displayed on the screen at any one time, although it will only be possible to move directly from a displayed page to one of the pages in the group which is the subject of an identification symbol. Thus, in this instance, it may be that the list of favorite pages is arranged in descending order of desirability. In that case, it would be expected that the viewer would go from one end to the other end of the list. Alternatively, the favorite pages could be sub-grouped by topic. Thus, for example, a first sub-group of pages could be devoted to news items, a further sub-group of pages to sports items, a further sub-group of pages to entertainment, and a further sub-group of pages to weather. Clearly, the subjects of the sub-groups will depend on the particular interests of the viewer. One convenient way this could be coded is to have those pages in a sub-group allocated identification symbols with one identification symbol reserved for the primary page of a different sub-group. In that way, the number of button operations required to reach a different sub-group will be minimized.

A plurality of groups of favorite pages may be stored, as some of the groups being associated with different viewers. In which case, a further identification symbol may identify which viewer is associated with the favorite pages selected.

In a family environment, the favorite pages of different members of the family may reflect their different interests. Thus, a teenage daughter may be interested in fashion and pop stars, whereas a teenage son may be interested in football and motoring. By making the further identification symbol indicate which viewer's favorite pages are being accessed, it enables a viewer to quickly move to his/her own favorite pages rather than accessing those of another member of the family by mistake.

BRIEF DESCRIPTION OF THE DRAWINGS

The above and other features and advantages of the invention will be apparent from the following description, by way of example, of an embodiment of the invention with reference to the accompanying drawings, in which.

DESCRIPTION OF THE PREFERRED EMBODIMENTS

Figure 1:
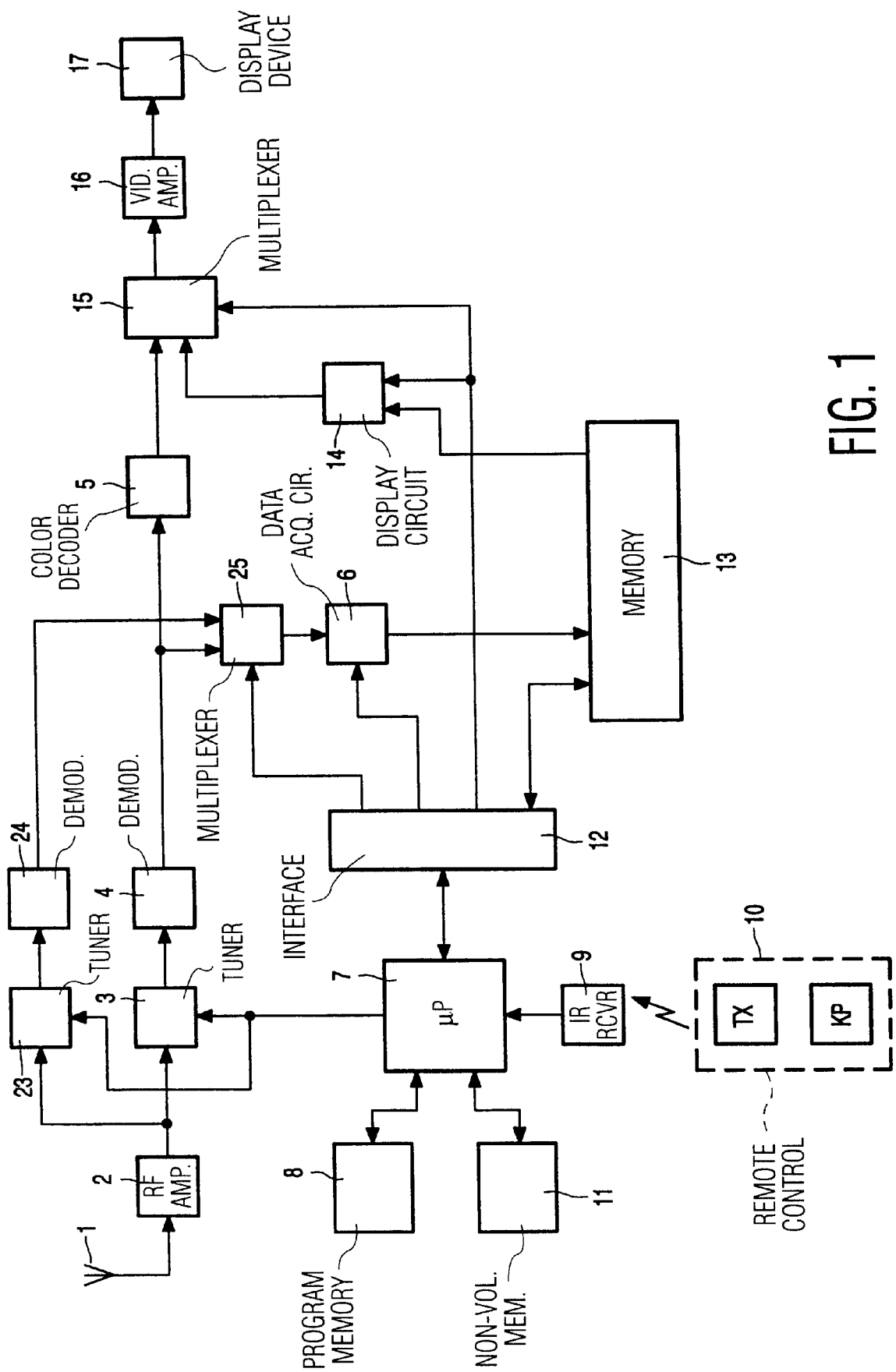
FIG. 1 shows, in block schematic form, a television receiver according to the invention.
Figure 2:
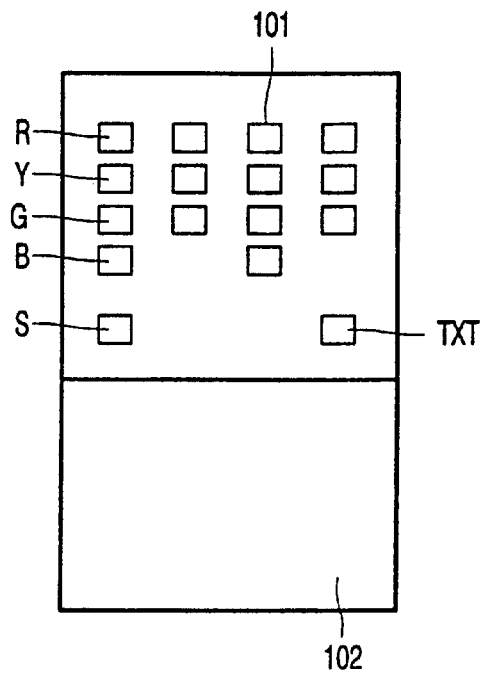
FIG. 2 shows a remote control unit for entering commands into the television receiver shown in FIG. 1.

As shown in FIG. 1, the television receiver comprises an aerial 1 which is connected to the usual RF amplifying circuit 2. The output of the RF amplifying circuit is fed to a tuning circuit 3, which selects the channel to be received. The output of the tuning circuit 3 is fed to a demodulation circuit 4 having an output for providing a combined video and blanking signal. The combined video and blanking signal is fed to a color decoder 5 and to a data acquisition circuit 6 which is arranged to acquire the data multiplexed with the television signal. A microprocessor 7 having a program memory 8 receives input signals from an infra-red receiver 9. These input signals are instructions from a user using a remote control unit 10 which comprises a keypad KP and an infra-red transmitter TX, to transmit appropriately coded instructions through the receiver 9 to the microprocessor 7. These instructions to the microprocessor 7 will include the usual functions of switching the receiver from standby to a particular channel, selecting whether a television picture or text should be displayed, and determining which data pages should be acquired for display. Thus, typically, the remote control unit 10 comprises a numerical keypad 101 and a number of other function keys in the shaded area 102 which relate to the selection for display of picture, text, or mixed mode, and many other features which may be provided on a television receiver and/or video recorder. The microprocessor 7 also has a non-volatile memory 11, in which data can be entered which gives, for example, the information needed to be passed from the microprocessor 7 to the tuning circuits 3 to select each of the channels. The data in the non-volatile memory 11 is entered at the time the television set is set up for initial use. The memory 11 may also include details of favorite pages of the data associated with given channels for a particular user. This information may be entered by the user using the keypad KP on the remote control unit 10 or may be derived and/or updated by monitoring which pages the user habitually requests. The microprocessor 7 is connected, through an interface circuit 12, to the data acquisition circuit 6 and to a memory 13 which stores the data for each page of the data signal which is acquired by the data acquisition circuit 6. In this way, the microprocessor 7 controls which pages of data are acquired and whether and at what locations in the memory 13 they are stored. In some circumstances, the data acquisition circuit 6 may be arranged to acquire all data transmitted and enter it into a FIFO (first in first out) memory, from which the microprocessor 7 transfers the pages the user desires to store in the memory 13. The microprocessor 7 further communicates, via the interface circuit 12, with a display circuit 14 which takes the data from the memory 13 and formats it for display on the screen of the television receiver.

The outputs of the color decoder 5 and display circuit 14 are fed to inputs of a multiplexer 15, which is arranged to select either the video or the text information for display, or to select a mixture of the two. The microprocessor 7 controls the operation of the multiplexer 15 via the interface circuit 12. The output of the multiplexer 15 is fed via video amplifiers 16 to a display device 17.

As shown in FIG. 1, the television receiver may comprise a second tuner 23 which feeds a second demodulator 24 whose output is coupled to an input of a multiplexer 25. When these components are included in the television receiver, the output of the demodulator 4 is further coupled to a second input of the multiplexer 25, and the output of the multiplexer 25 is connected to the data acquisition circuit 6. The multiplexer 25 is controlled by the microprocessor 7 through the interface circuit 12. In this arrangement, the second tuner 23 and demodulator 24 may be arranged to scan through the available channels to continuously acquire and update the favorite pages associated with that channel. Thus, the viewer can view a particular program which is selected by the tuner 3 and, at the same time, the receiver is continuously updating the favorite pages for all the channels. In this way, the acquisition of the favorite pages is transparent to the viewer as it is carried out in the background by the receiver under the control of the microprocessor 7 using the additional tuning and demodulation circuits.

When the television receiver is switched on, the microprocessor 7 accesses the non-volatile memory 11 to obtain the favorite pages for the channel to which the receiver is tuned. The microprocessor 7 then instructs the data acquisition circuit 6 to acquire these favorite pages and store them in the memory 13. If any of these pages are also linked to other pages by means of FASTEXT or TOP links, then the microprocessor 7 will decode the linking instructions and cause the data acquisition circuit 6 to acquire those additional pages and enter them into the memory 13. When the viewer selects the text function using the remote control unit 10, the microprocessor causes the first of the favorite pages to be displayed on the display device 17, unless the user, at the same time, requests a particular page number. The microprocessor 7, at the same time, causes a further identification symbol to be displayed on the display screen 17, the further identification symbol representing the fact that this is a group of favorite pages and that colored identification symbols represent pages linked to the first page of the Favorite Pages list. If the user then wants to view further pages on the Favorite Pages List, then appropriately colored buttons are operated on the remote control unit 10 which selects those further pages. It may be, however, that the viewer decides to access linked pages using the TOP or FASTEXT function instead of accessing further Favorite Pages. In that case, a scroll button is pressed on the remote control unit 10 which causes the further identification symbols to scroll through the different functions, that is, FASTEXT, TOP, favorite pages, and any other grouping that may be available. Conveniently, the identification symbols consist of short catch-words which indicate the information content of the linked pages and which are selectable by operating similarly colored buttons on the remote control unit 10. Clearly, as the further identification symbol is scrolled, the catch-words will alter as the information content of the pages linked in the different ways is likely to be different, but the colors in which the catch-words are displayed will remain the same. As an alternative to the use of differently colored catch-words, it is also possible to use differently colored page numbers so that the page number which is linked to the currently displayed page is directly indicated. A further alternative is to use colored graphic icons to represent the information content of the linked pages or some other relationship between the pages.

The remote control unit 10 may also be arranged to transmit a signal which indicates which one of a number of different users is operating the unit. Thus, different members of a family may transmit different codes to the infrared receiver 9, and the microprocessor 7 will then recognize which member of the family is using the television receiver and access favorite pages which are associated with that particular family member. The further identification symbol may then be the name or nickname of the member of the family. Thus, it will be immediately apparent to the viewer whether it is his/her favorite page or the favorite page of a different member of the family.

One way in which the television receiver may detect which member of a group of viewers is currently controlling the television receiver is that each of the viewers has a different remote control unit which sends a unique code to the infrared receiver 9 when it switches the television receiver from stand-by to the active state. In this way, the microprocessor 7 can detect which viewer is controlling the television receiver and, therefore, which set of favorite pages to acquire. If, however, a viewer uses a remote control unit belonging to another member of the group, that viewer will bring up the wrong set of favorite pages and the additional identification symbol will enable the viewer to recognize that fact when the remote control unit in question may have been picked up by mistake. By using the scroll button on the remote control unit, the microprocessor 7 then causes the further identification symbol to scroll to the actual user, and can then be instructed to obtain the favorite pages of the viewer actually in control of the television receiver. There may, of course, be a delay before the favorite pages of the actual user become available but, at least the viewer will be aware that the reason for this is that the wrong remote control unit has been used to activate the television receiver. In addition, of course it does enable a viewer to monitor the favorite pages of any of the other users in the group.

In co-pending U.S. patent application Ser. No. 09/454, 343, filed Dec. 3, 1999 (PHB34303), it is disclosed that it is possible to store favorite pages for channels other than the one to which the receiver is currently tuned. It is also disclosed that it is possible to display such pages and, thus, the receiver may be tuned to one channel while the teletext display is of the data in a different channel. The further identification symbol or an additional further identification symbol may be arranged to indicate the channel with which the data is associated, which may not be that to which the television receiver is currently tuned.

In order to enable the viewer to control these functions, the remote control handset 10 may be provided with a numerical keypad 101, and a plurality of color-coded buttons R,Y,G,B which correspond to the colors of the identification symbols on the display screen. A further button 'S', which is used to scroll the further identification symbol, is provided, and the shaded area 102 contains push buttons which control other functions of the TV receiver and/or audio visual device. Thus, the user is presented with a remote control unit which is substantially the same as that to which he or she has become accustomed, with the addition only of a scroll button which causes the further identification symbol to scroll through the various possibilities. The microprocessor 7 automatically changes the meaning of the identification symbols as the further identification symbol is scrolled. Thus, the viewer is constantly presented with the information which is relevant to the choices to be made.

Figure 3A:
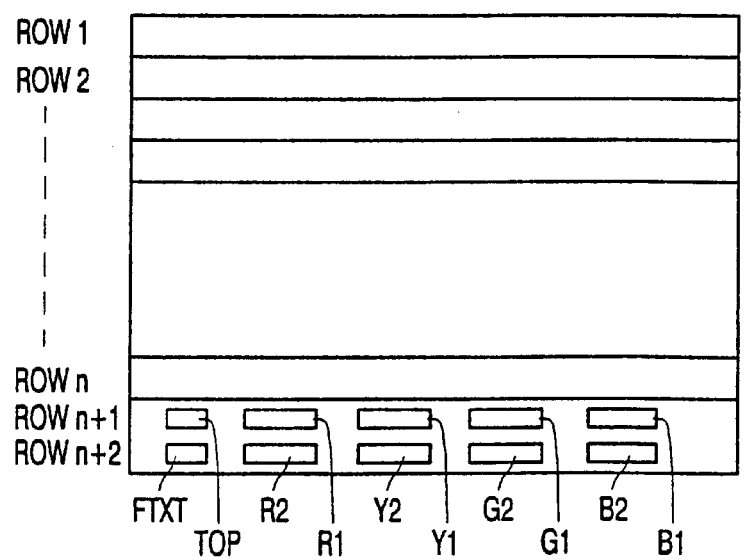
FIGS. 3a–3c show examples of a non-exhaustive number of possibilities for displaying identification and further identification symbols on the display.
Figure 3B:
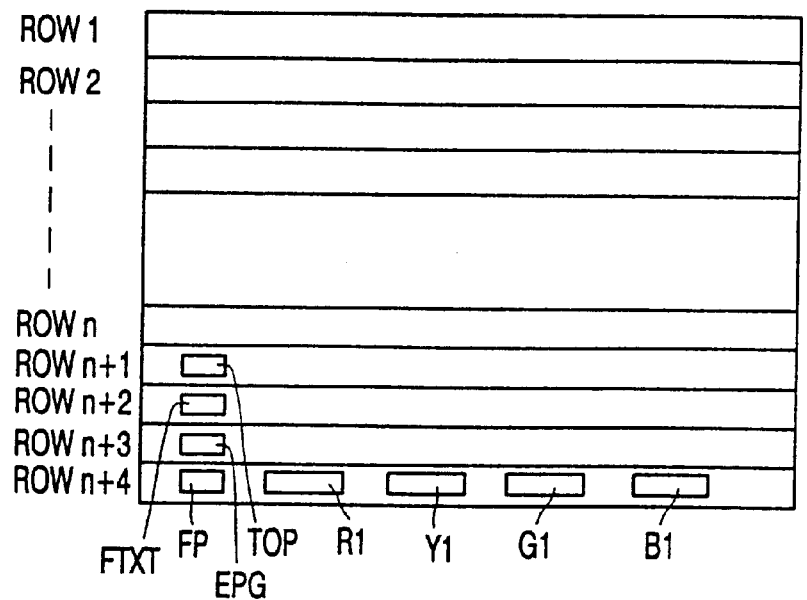
Figure 3C:
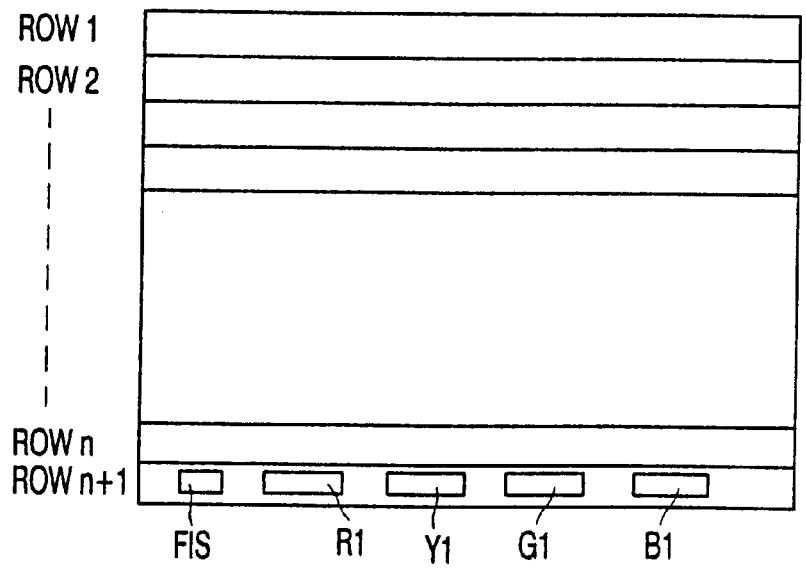

FIGS. 3a–3c show examples of possible display formats for the identification symbols. As shown in FIG. 3a, the page of information is displayed in rows 1 to n, while two or more rows of identification symbols are displayed in rows n+1, n+2, etc. In this example, the identification symbols R1, Y1, G1, B1 may represent pages linked to the displayed page by means of TOP links, and a further identification symbol TOP may occupy the left hand end of the row n+1. The identification symbols R2, Y2, G2, B2 may represent pages linked to the present page by FASTEXT links, and the further identification symbols FTXT may occupy the left hand end of the row n+2.

In order to select one of the other pages of a group, the viewer operates the scroll button to highlight either the TOP or FTXT identification symbol and then operates on of the R,G,Y or B buttons which selects the linked page having the corresponding identification symbol in row n+1, if the scroll button causes the further identification symbol TOP to be highlighted, or if the scroll button causes the further identification symbol FTXT to be highlighted, then the linked page having the corresponding identification symbol in row n+2 is selected.

Clearly, further rows n+3, n+4, etc., could be provided if there are further groups of pages which can be selected in this way, but as more rows are used for this purpose, the number of rows which can be used for the page display are reduced.

FIG. 3b shows an alternative display screen arrangement which uses only one row of identification symbols for the pages which are linked to the page currently being displayed but which has a number of further identification symbols which are displayed at the left hand end of a plurality of rows. As shown, these further identification symbols are labelled TOP, FTXT, FP and EPG. This represents groups which are linked according to the TOP system, the FASTEXT system, electronic program guide links (EPG) and favorite pages (FP). In this case, only one row is occupied by the identification symbols for the linked pages in the group, and only a single further identification symbol is present in the other rows.

In this case, operation of the scroll button will highlight each of the further identification symbols in turn, and will cause the identification symbols corresponding to the group selected to be displayed in the bottom row and to be selectable using the R, Y, G, and B buttons.

FIG. 3c shows a further alternative display screen arrangement which uses only one row for both the identification symbols R,G,Y,B and the further identification symbols FIS.

In this case, the operation of the scroll button will cause the further identification symbol FIS to scroll through all the different further identification symbols i.e., TOP, FTXT, EPG, FP, etc. Thus, as each further identification symbol is displayed, it informs the viewer which grouping of pages is active and the associated identification symbols will change to indicate the content of the linked pages which will be selected according to the criteria of the group associated with the further identification symbol.

While, in FIGS. 2 and 3a–3c, four identification symbols are displayed on the screen associated with four corresponding buttons on a remote control, the invention is not limited in this way. A greater or lesser number of identification symbols may be provided and they may be arranged on the display screen in any convenient manner, and not necessarily in rows or at the bottom of the screen. The further identification symbols may be displayed in a row with the identification symbols, but could alternatively be located at any convenient position on the screen.

The identification symbols may be short catch-words identifying the information content of the associated page in the same manner as is currently used for FASTEXT and TOP teletext displays, but could be graphic or numerical indications as may be convenient. The four identification symbols as shown in FIG. 3 may be in four different colors, for example, red, green, yellow, and blue, as is presently used for FASTEXT services in the UK, but any other distinguishing symbols may be used.

A further possibility for the display of the further identification symbols which does not require the continuous occupation of display space is to cause the further identification symbol to "pop-up" on the display on pressing an appropriate button on the remote control unit. This symbol then disappears after a given time, for example, five seconds. Repeated pressing of the button may cause scrolling through the further identification symbols. This is similar in concept to the practice in many current television receivers of displaying the channel number or identification for a short time when the viewer changes channel.

Thus, a viewer may press the button a first time to discover which service is currently being displayed, and each further depression of the button will cause the next service to be provided and the appropriate further identification symbol to be temporarily be displayed.

The number of different groups, and, consequently, further identification symbols, is dependent on the number of different groups which might be provided. Thus, a more basic receiver might have a small number, while a more expensive receiver might have many different groups. If, as disclosed in co-pending U.S. patent application Ser. No. 09/454,343, filed Dec. 3, 1999 (PHB 34303), it is possible to access pages associated with channels other than that being currently viewed, the number of groups being multiplied by the number of channels and the further identifying symbols including channel identifying symbols.

From reading the present disclosure, other modifications will be apparent to persons skilled in the art. Such modifications may involve other features which are already known in the design and use of television receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization of one or more of those features which would be obvious to persons skilled in the art, whether or not it relates to the same invention as presently claimed in any claim and whether or not it mitigates any or all of the same technical problems as does the present invention. Applicants hereby give notice that new claims may be formulated to such features and/or combinations of such features during the prosecution of the present application or of any further application derived therefrom.

What is claimed is:

1. A television receiver for receiving a television picture signal having a data signal associated therewith, said associated data signal representing pages of text and/or graphics, a page being the data displayable in place of or superimposed on a television picture, said television receiver comprising:

a data acquisition circuit for acquiring at least selected pages of said associated data;

a multi-page memory for storing a plurality of pages of data;

means for grouping acquired pages according to a plurality of different criteria, one or more of the pages of each group being linked with a page of that group currently being displayed;

page selection means for selecting a page for display;

means for displaying a plurality of identification symbols relating to at least some of the pages linked to the displayed page, each of said identification symbols being related to a symbol on said page selection means for selecting, for display, a linked page identified by an identification symbol; and means for displaying one or more further identification symbols for indicating which criteria apply to the group whose identification symbols are currently being displayed, wherein each of the identification symbols has a different color.

2. The television receiver as claimed in claim 1, in which the page selection means comprises a remote control unit having a plurality of color-coded keys having colors corresponding to the colors of the identification symbols, said television receiver further comprising means for selecting for display the page identified by the color of the key operated on the remote control unit.

3. A television receiver for receiving a television picture signal having a data signal associated therewith, said associated data signal representing pages of text and/or graphics, a page being the data displayable in place of or superimposed on a television picture, said television receiver comprising:

a data acquisition circuit for acquiring at least selected pages of said associated data;

a multi-page memory for storing a plurality of pages of data;

means for grouping acquired pages according to a plurality of different criteria, one or more of the pages of each group being linked with a page of that group currently being displayed;

page selection means for selecting a page for display;

means for displaying a plurality of identification symbols relating to at least some of the pages linked to the displayed page, each of said identification symbols being related to a symbol on said page selection means for selecting, for display, a linked page identified by an identification symbol; and means for displaying one or more further identification symbols for indicating which criteria apply to the group whose identification symbols are currently being displayed, wherein, when a displayed page is a member of more than one group, a corresponding number of rows of identification symbols are displayed, and a corresponding further symbol is associated with each row.

4. A television receiver for receiving a television picture signal having a data signal associated therewith, said associated data signal representing pages of text and/or graphics, a page being the data displayable in place of or superimposed on a television picture, said television receiver comprising:

a data acquisition circuit for acquiring at least selected pages of said associated data;

a multi-page memory for storing a plurality of pages of data;

means for grouping acquired pages according to a plurality of different criteria, one or more of the pages of each group being linked with a page of that group currently being displayed;

page selection means for selecting a page for display;

means for displaying a plurality of identification symbols relating to at least some of the pages linked to the displayed page, each of said identification symbols being related to a symbol on said page selection means for selecting, for display, a linked page identified by an identification symbol; and means for displaying one or more further identification symbols for indicating which criteria apply to the group whose identification symbols are currently being displayed, wherein one of the groups is a group of favorite pages entered by a viewer or generated by the television receiver monitoring the pages habitually selected by the viewer, wherein a plurality of groups of favorite pages are stored, at least some of the groups being associated with different users of the television receiver, and wherein a further identification symbol identifies which user is associated with the group of favorite pages selected.

* * * * *